_(12)_ United States Patent
Kanemitsu et al.

(10) Patent No.: US 8,305,459 B2
(45) Date of Patent: Nov. 6, 2012

(54) IMAGE PROCESSING APPARATUS AND CAMERA MODULE

(75) Inventors: Shiroshi Kanemitsu, Kanagawa (JP); Hirotoshi Aizawa, Kanagawa (JP); Takaaki Kawakami, Kanagawa (JP); Kazuhiro Tabuchi, Kanagawa (JP); Jun Inagawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 242 days.

(21) Appl. No.: 12/870,124

(22) Filed: Aug. 27, 2010

(65) Prior Publication Data

US 2011/0122273 A1     May 26, 2011

(30) Foreign Application Priority Data

Nov. 25, 2009   (JP) ................................. 2009-267352

(51) Int. Cl.
*H04N 5/228*       (2006.01)
(52) U.S. Cl. ...................... 348/222.1; 348/273; 382/279
(58) Field of Classification Search .............. 348/222.1, 348/273; 382/279
See application file for complete search history.

(56) References Cited

U.S. PATENT DOCUMENTS

2003/0222998 A1*  12/2003  Yamauchi et al. ............ 348/262
2008/0284626 A1*  11/2008  Hattori ......................... 341/133

FOREIGN PATENT DOCUMENTS

JP   2001-197512 A    7/2001
JP   2008-283467 A   11/2008

OTHER PUBLICATIONS

Background Art Information Sheet provided by applicants (Apr. 5, 2010) (1 page total).
Corrected Background Art Information Sheet provided by applicant (May 25, 2010) (1 page total).
U.S. Appl. No. 12/706,186, filed Feb. 16, 2010, Kanemitsu.

* cited by examiner

*Primary Examiner* — Sinh Tran
*Assistant Examiner* — Paul Berardesca
(74) *Attorney, Agent, or Firm* — Posz Law Group, PLC

(57) ABSTRACT

According to the Embodiments, an Image Processing apparatus includes a pixel interpolation processing unit. The pixel interpolation processing unit generates a sensitivity level value through addition of a first frequency range component of an image signal for a lacking color component and a second frequency range component of a frequency band lower than the first frequency range component. The pixel interpolation processing unit adjusts a ratio of the first frequency range component to be added to the second frequency range component.

12 Claims, 3 Drawing Sheets

| D1 | D2 | D3 | D4 | D5 |
|----|----|----|----|----|
| D6 | D7 | D8 | D9 | D10 |
| D11 | D12 | D13 | D14 | D15 |
| D16 | D17 | D18 | D19 | D20 |
| D21 | D22 | D23 | D24 | D25 |

IMAGE PROCESSING APPARATUS AND CAMERA MODULE

CROSS-REFERENCE TO RELATED APPLICATIONS

This application is based upon and claims the benefit of priority from the prior Japanese Patent Application No. 2009-267352, filed on Nov. 25, 2009; the entire contents of all of which are incorporated herein by reference.

FIELD

Embodiments described herein relate generally to an image processing apparatus and a camera module.

BACKGROUND

A so-called single-plate imaging apparatus, which is one of full-color imaging apparatuses, is suitable for a case of requiring size reduction and cost reduction of a configuration such as a consumer digital still camera (DSC) and a camera-equipped cell-phone. In the single-plate imaging apparatus, any of color filters for red (R), green (G), and blue (B) is provided on a photoelectric element, and an image signal of a plurality of colors is obtained from one two-dimensional imaging element by calculating sensitivity signals of lacking color components for each pixel position. A sensitivity level value for the lacking color component is generated by interpolation processing that uses known sensitivity level values at a target pixel and peripheral pixels therearound (for example, see Japanese Patent Application Laid-open No. 2001-197512).

Conventionally, in generating the sensitivity level value of the lacking color component, for example, a method is employed, in which a low-frequency component and a high-frequency component of image signals are extracted and added. Degradation of resolution is suppressed by the addition of the high-frequency component, so that it is possible to obtain a high-resolution image on which pixel interpolation processing is performed. However, in the case of requiring image processing that focuses on S/N (signal to noise ratio) more than the resolution, such as shooting under a low illumination environment, the high-frequency component may become a factor of S/N degradation. Moreover, when an image signal is converted from an ROB format into a YUV format to output, a color noise may be degraded due to the high-frequency component.

DETAILED DESCRIPTION

In general, according to one embodiment, an image processing apparatus includes a pixel interpolation processing unit. The pixel interpolation processing unit generates a sensitivity level value of a lacking color component by interpolation processing of an image signal. The pixel interpolation processing unit generates the sensitivity level value through addition of a first frequency range component of the image signal for the lacking color component and a second frequency range component of a frequency band lower than the first frequency range component. The pixel interpolation processing unit adjusts a ratio of the first frequency range component to be added to the second frequency range component.

Exemplary embodiments of an image processing apparatus and a camera module will be explained below in detail with reference to the accompanying drawings. The present invention is not limited to the following embodiments.

Figure 1:
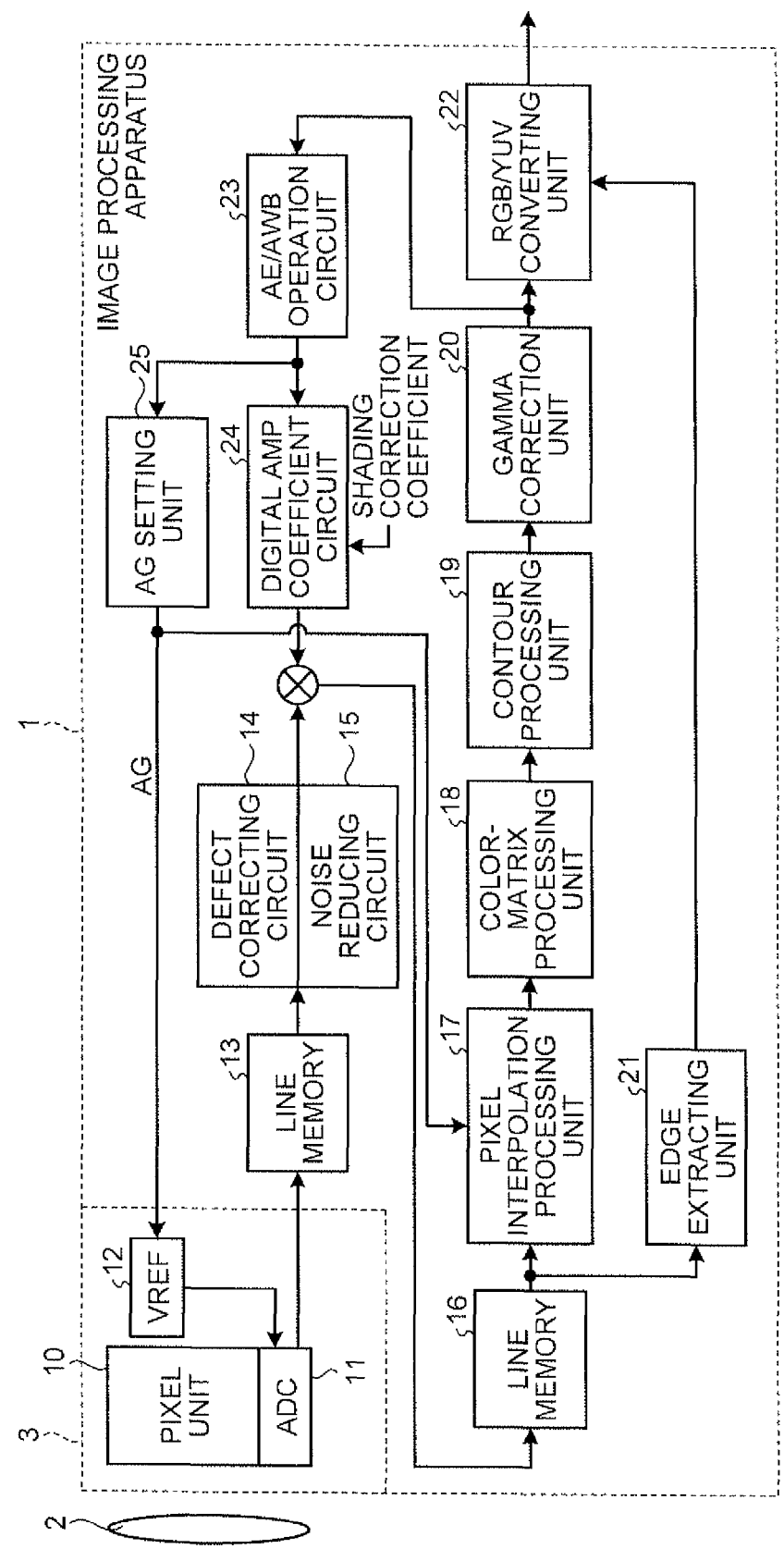
FIG. 1 is a block diagram illustrating a configuration of a camera module including an image processing apparatus according to a first embodiment.

FIG. 1 is a block diagram illustrating a configuration of a camera module including an image processing apparatus 1 according to a first embodiment. The camera module includes the image processing apparatus 1, an imaging lens 2, and an image sensor 3. The imaging lens 2 captures light from an object and forms an object image in a pixel unit 10 of the image sensor 3. The image sensor 3 includes the pixel unit 10, an analog-digital converter (ADC) 11, and a triangular-wave (VREF) generating circuit 12.

The pixel unit 10 images an object image by converting light from an object into signal charges. The pixel unit 10 captures signal values of R, G, and B in the order corresponding to a Bayer array and generates analog signals. The ADC 11 converts the analog signal from the pixel unit 10 into a digital signal (AD conversion). The ADC 11 can be integrated with a column noise cancelling circuit (CDS). The VREF generating circuit 12 generates a VREF used for the AD conversion in the ADC 11.

The image processing apparatus 1 performs various image processing to be explained below on the digital image signal output from the ADC 11. A defect correcting circuit 14 performs defect correcting processing for correcting a missing portion (defect) of the digital image signal due to a pixel that does not function normally in the pixel unit 10. A noise reducing circuit 15 performs noise reducing processing.

A pixel interpolation processing unit 17 performs pixel interpolation processing (demosaic processing) on the digital image signals transmitted in the order of the Bayer array. A color-matrix processing unit 18 performs color-matrix operation processing (color reproducibility processing) for obtaining color reproducibility. A contour processing unit 19 performs contour enhancement processing by using a correction coefficient calculated based on an imaging condition by the image sensor 3 and a position of each pixel.

A gamma correction unit 20 performs gamma correction for correcting saturation and brightness of an image. An edge extracting unit 21 extracts an edge from the digital image signals transmitted in the order of the Bayer array and outputs the extraction result to an RGB/YUV converting unit 22. The RGB/YUV converting unit (signal converting unit) 22 converts an image signal from an RGB format into a YUV format (for example, YUV 422) by generating a luminance (Y) signal and a chrominance (UV) signal from sensitivity level signals of R, G, and B.

An AE/AWB operation circuit 23 calculates each coefficient for AE (auto exposure) and AWB (auto white balance) from the result of the gamma correction by the gamma correction unit 20 and output them. A digital AMP coefficient circuit 24 calculates a digital AMP coefficient based on the output of the AE/AWB operation circuit 23 and a shading correction coefficient. An analog gain (AG) setting unit 25 sets AG based on the output of the AE/AWB operation circuit 23. The AG set in the AG setting unit 25 is input to the VREF generating circuit 12 and the pixel interpolation processing unit 17. The VREF generating circuit 12 generates the VREF in accordance with the AG from the AG setting unit 25.

Line memories 13 and 16 temporarily store therein data on the digital image signals transmitted in the order corresponding to the Bayer array. The defect correcting circuit 14 and the noise reducing circuit 15 share the line memory 13. The image processing apparatus 1 performs digital gain AMP processing for the AE, the AWB, and a lens shading correction on the image signals from the defect correcting circuit 14 and the noise reducing circuit 15 by the digital AMP coefficient from the digital AMP coefficient circuit 24. The image signal on which the digital gain AMP processing is performed is stored in the line memory 16.

The image processing apparatus 1 sequentially performs respective processing from the pixel interpolation processing unit 17 to the RGB/YUV converting unit 22 on the image signal stored in the line memory 16 and outputs the image signal converted into the YUV format in the RGB/YUV converting unit 22. The configuration of the image processing apparatus 1 explained in the present embodiment is only an example and can be appropriately modified. For example, in the configuration explained in present embodiment, change, such as addition of an element for other processing and omission of an optional element, can be made.

Figures 2, 3:
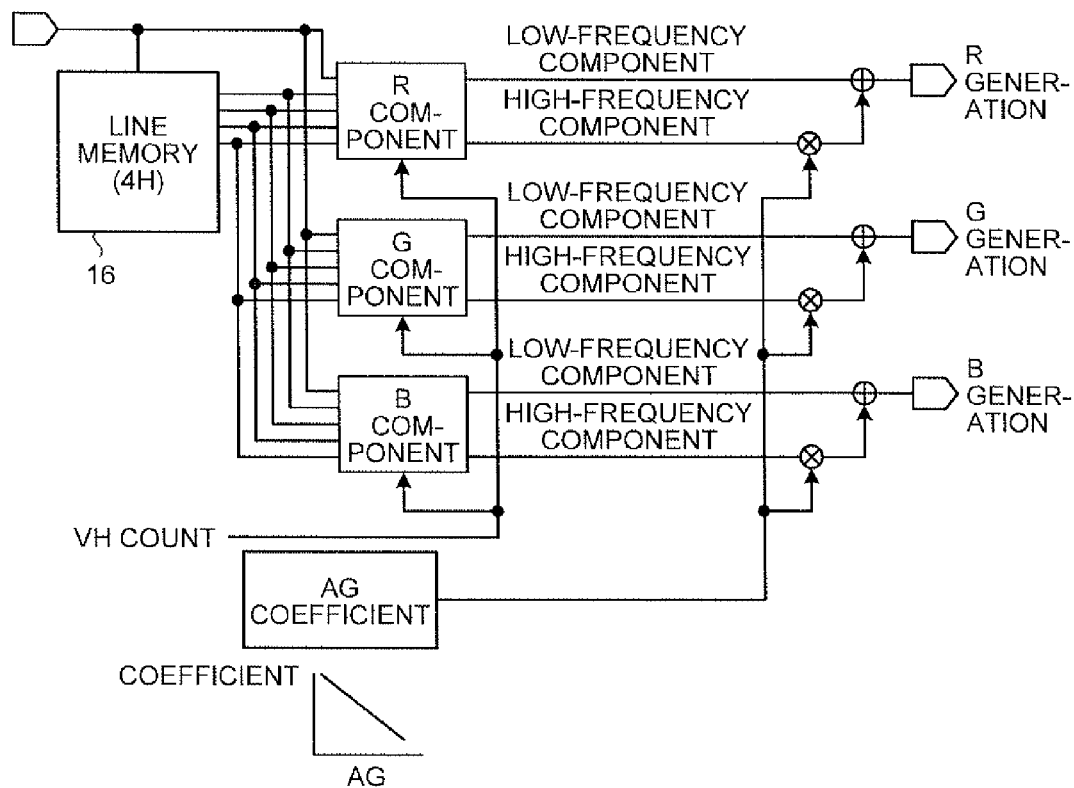
FIG. 2 is a diagram explaining an example of an embodiment of interpolation processing in a pixel interpolation processing unit.
FIG. 3 is a block diagram explaining an operation of the interpolation processing by the pixel interpolation processing unit.

FIG. 2 is a diagram explaining an example of an embodiment of the interpolation processing in the pixel interpolation processing unit 17. An R pixel is a pixel that is provided with a color filter that selectively transmits R light, in which R is a known color component and G and B are lacking color components. A G pixel is a pixel that is provided with a color filter that selectively transmits G light, in which G is the known color component and R and B are the lacking color components. A B pixel is a pixel that is provided with a color filter that selectively transmits B light, in which B is the known color component and R and G are the lacking color components. In the pixel unit 10, the R pixels, the G pixels, and the B pixels are arranged in the Bayer array.

As shown in FIG. 2, 25 pixels D1 to D25 are arranged in a matrix manner of 5×5. When the center pixel D13 of the 25 pixels D1 to D25 is the R pixel, the pixel interpolation processing unit 17 calculates each sensitivity level value of R, G, and B for the pixel D13, for example, by the following equation. The sensitivity level values of G and B as the lacking color components of the pixel D13 are generated by the interpolation processing using the sensitivity level values of the known color components. In the following equation, D1, D2, . . . , and D25 represent the sensitivity level values of the known color components detected in the pixel D1, the pixel D2, . . . , and the pixel D25, respectively.

$R = D13$ $G = (D8+D12+D14+D18)/4 + \{D13-(D3+D11+D15+D23)/4\}/4$ $B = (D7+D9+D17+D19)/4 + \{D13-(D3+D11+D15+D23)/4\}/2$

In the interpolation equation used for G, the former term $(D8+D12+D14+D18)/4$ corresponds to the low-frequency component extracted from the image signals and $\{D13-(D3+D11+D15+D23)/4\}$ in the latter term corresponds to the high-frequency component extracted from the image signals. In the interpolation equation used for B, the former term $(D7+D9+D17+D19)/4$ corresponds to the low-frequency component extracted from the image signals and $\{D13-(D1+D11+D15+D23)/4\}$ in the latter term corresponds to the high-frequency component extracted from the image signals. The pixel interpolation processing unit 17 generates the sensitivity level value through addition of the high-frequency component that is a first frequency range component of the image signals for the lacking color component and the low-frequency component that is a second frequency range component of a frequency band lower than the first frequency range component.

FIG. 3 is a block diagram explaining an operation of the interpolation processing by the pixel interpolation processing unit 17. The line memory 16 holds the digital image signals for four lines (4H). In the pixel interpolation processing unit 17, data for totally five lines, i.e., the four lines held in the line memory 16 and one line immediately before being input to the line memory 16, is input.

The pixel interpolation processing unit 17 samples the signal values of the data input on the five lines in accordance with a VH count, and generates each sensitivity level value of the R component, the G component, and the B component. The pixel interpolation processing unit 17 applies the interpolation equation similar to the above to each color component to extract the low-frequency component and the high-frequency component for each of the R component, the G component, and the B component.

The pixel interpolation processing unit 17 multiplies the high-frequency component of each color component by the AG coefficient before adding the low-frequency component and the high-frequency component for each of the R component, the G component, and the B component. The AG coefficient is a coefficient that is correlated with an analog gain of the image signal set in the AG setting unit 25. The AG coefficient is set to have a correlation so that the AG coefficient is linearly lowered as the AG becomes high. In the image processing apparatus 1, the correlation between the AG and the AG coefficient is stored in advance. The pixel interpolation processing unit 17 multiplies the high-frequency component by the AG coefficient obtained by referring to the correlation with respect to the AG input from the AG setting unit 25. The pixel interpolation processing unit 17 adjusts the ratio of the high-frequency component to be added to the low-frequency component by the multiplication of the AG coefficient. The pixel interpolation processing unit 17 outputs the sensitivity level value of each color component generated through addition of the low-frequency component and the high-frequency component that is multiplied by the AG coefficient.

The high-frequency component is multiplied by the AG coefficient having a correlation so that the AG coefficient is lowered as the AG becomes high, so that the pixel interpolation processing unit 17 adjusts to reduce the ratio of the high-frequency component in the condition in which the AG is made high such as shooting under a low illumination environment. Therefore, in the case of requiring the image processing that focuses on S/N more than resolution, it becomes possible to reduce the ratio of the high-frequency component to be a factor of degradation of the S/N. The sensitivity level value is generated through addition of the high-frequency component of which ratio is adjusted in accordance with the AG, so that it also becomes possible to obtain the effect of suppressing degradation of the resolution. Thus, the image processing apparatus 1 can suppress degradation of the resolution in the case of generating the sensitivity level value of the lacking color component by the interpolation processing of the image signal and suppress degradation of the S/N.

The interpolation processing applied in the present embodiment can use any method in which extraction of the high-frequency component and the low-frequency component of the image signals is performed, and the interpolation equation can be appropriately modified. The number of lines of data input for the interpolation processing is not limited to the case of five lines explained in the present embodiment and can be any number.

The AG coefficient is not limited to the case of having the correlation to linearly increase or decrease with respect to the AG, and it is sufficient that the AG coefficient is set to become a low value with respect to the high AG requiring improvement of the S/N. For example, an inverse number of the AG can be employed as the AG coefficient. Moreover, it is applicable that the pixel interpolation processing unit 17 adjusts the ratio of the high-frequency component with respect to the AG only in a predetermined range in which the image processing focusing on the S/N more than the resolution is required.

Figure 4:
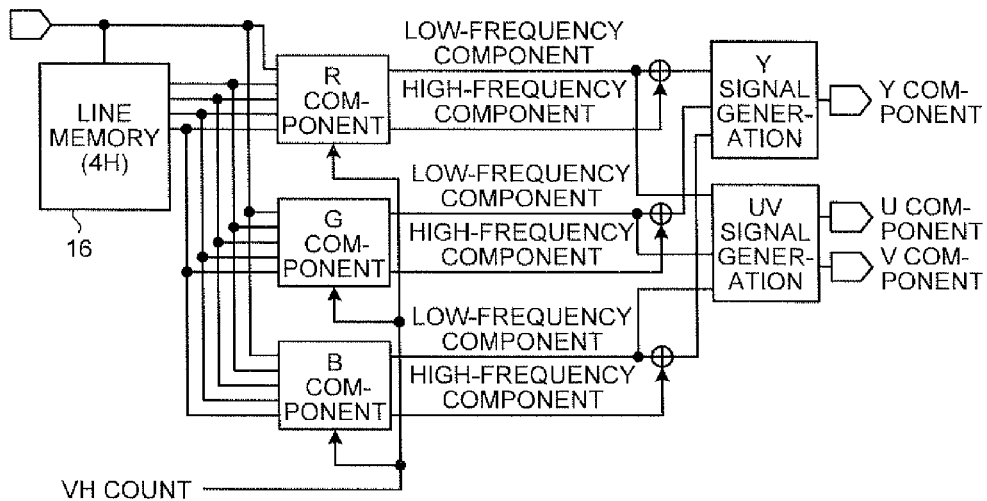
FIG. 4 is a block diagram explaining an operation of the interpolation processing and a signal conversion in an image processing apparatus according to a second embodiment.

FIG. 4 is a block diagram explaining an operation of the interpolation processing and a signal conversion in an image processing apparatus according to a second embodiment. The present embodiment is characterized in that the chrominance (UV) signal is generated from the low-frequency components of the image signals in the signal conversion in the RGB/YUV converting unit 22. Components that are the same as those in the first embodiment are given the same reference numerals and overlapping explanation is appropriately omitted.

The pixel interpolation processing unit 17 extracts the low-frequency component and the high-frequency component for each of the R component, the G component, and the B component and generates the sensitivity level value of the lacking color component by addition of the low-frequency component and the high-frequency component. The RGB/YUV converting unit 22 generates a Y signal from the low-frequency components and the high-frequency components that are extracted and added in the pixel interpolation processing unit 17 and outputs the sensitivity level value of the Y component. Moreover, the RGB/YUV converting unit 22 generates the UV signal only from the low-frequency components from among the low-frequency components and the high-frequency components that are extracted in the pixel interpolation processing unit 17 and outputs the sensitivity level values of the U component and the V component.

In this manner, the UV signal is generated from the ROB signal from which the high-frequency component is removed, so that degradation of the S/N ratio related to chromaticity can be suppressed. In view of the fact that people are more sensitive to change in the luminance than change in the chromaticity, degradation of the resolution can be suppressed by generating the Y signal from the ROB signal in which the low-frequency component and the high-frequency component are added. Therefore, in the present embodiment again, it becomes possible to suppress degradation of the resolution in the case of generating the sensitivity level value of the lacking color component by the interpolation processing of the image signal and suppress degradation of the S/N.

Figure 5:
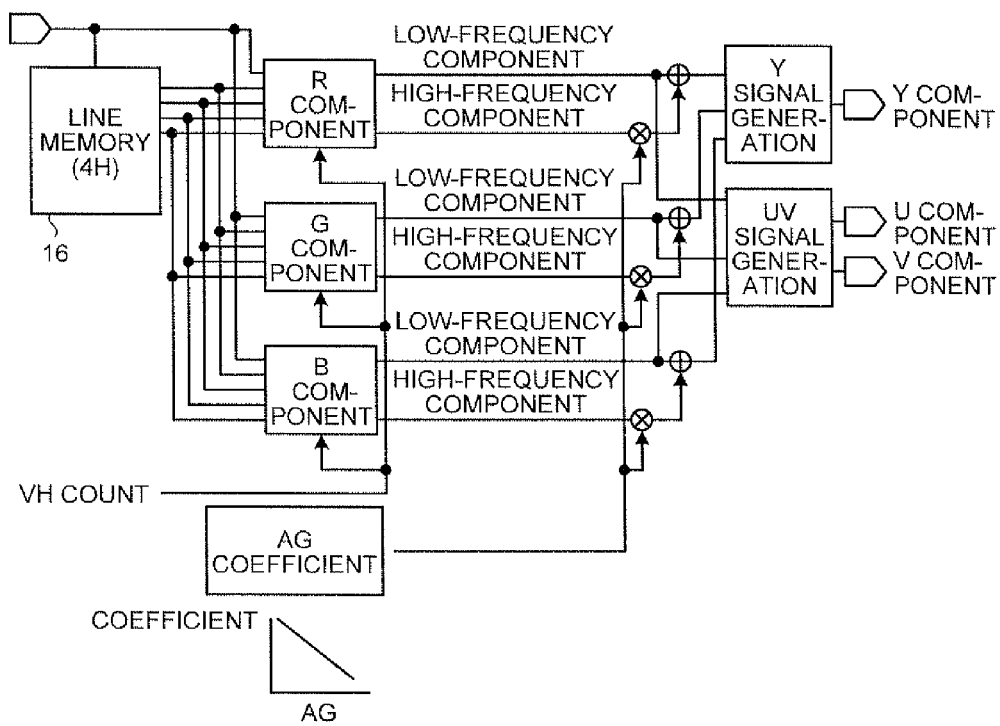
FIG. 5 is a block diagram explaining an operation of the interpolation processing and the signal conversion in an image processing apparatus according to a third embodiment.

FIG. 5 is a block diagram explaining an operation of the interpolation processing and the signal conversion in an image processing apparatus according to a third embodiment. The present embodiment is characterized in that characteristics of the first embodiment and the second embodiment are combined. Components that are the same as those in the first embodiment and the second embodiment are given the same reference numerals and overlapping explanation is appropriately omitted.

The pixel interpolation processing unit 17 multiplies the high-frequency component of each color component by the AG coefficient before adding the low-frequency component and the high-frequency component for each of the R component, the G component, and the B component. The AG coefficient is set to have a correlation so that the AG coefficient is linearly lowered as the AG becomes high. The pixel interpolation processing unit 17 outputs the sensitivity level value of each color component generated through addition of the low-frequency component and the high-frequency component that is multiplied by the AG coefficient.

The RGB/YUV converting unit 22 generates the Y signal from the low-frequency components and the high-frequency components that are extracted and added in the pixel interpolation processing unit 17 and outputs the sensitivity level value of the Y component. Moreover, the RGB/YUV converting unit 22 generates the UV signal only from the low-frequency components from among the low-frequency components and the high-frequency components that are extracted in the pixel interpolation processing unit 17 and outputs the sensitivity level values of the U component and the V component.

In the present embodiment again, it becomes possible to suppress degradation of the resolution in the case of generating the sensitivity level value of the lacking color component by the interpolation processing of the image signal and suppress degradation of the S/N.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a pixel interpolation processing unit that generates a sensitivity level value of a lacking color component by interpolation processing of an image signal, wherein
the pixel interpolation processing unit generates the sensitivity level value through addition of a first frequency range component of the image signal for the lacking color component and a second frequency range component of a frequency band lower than the first frequency range component, and adjusts a ratio of the first frequency range component to be added to the second frequency range component, and
the pixel interpolation processing unit adjusts the ratio of the first frequency range component by multiplication of an analog gain coefficient that is correlated with an analog gain of the image signal.

2. The image processing apparatus according to claim 1, wherein the analog gain coefficient is set to have a correlation so that the analog gain coefficient is lowered as the analog gain becomes high.

3. The image processing apparatus according to claim 1, further comprising a signal converting unit that converts a sensitivity level signal for each color component into a chrominance signal and a luminance signal, wherein
the signal converting unit generates the luminance signal from the first frequency range component of which ratio is adjusted in the pixel interpolation processing unit and the second frequency range component.

4. The image processing apparatus according to claim 3, wherein the signal converting unit generates the chrominance signal from the second frequency range component.

5. An image processing apparatus comprising:
a pixel interpolation processing unit that generates a sensitivity level value of a lacking color component by interpolation processing of an image signal; and
a signal converting unit that converts a sensitivity level signal for each color component into a chrominance signal and a luminance signal, wherein
the pixel interpolation processing unit generates the sensitivity level value through addition of a first frequency range component of the image signal for the lacking color component and a second frequency range component of a frequency band lower than the first frequency range component,
the pixel interpolation processing unit adjusts a ratio of the first frequency range component to the second frequency range component used for generation of the luminance signal,
the pixel interpolation processing unit adjusts the ratio of the first frequency range component by multiplication of an analog gain coefficient that is correlated with an analog gain of the image signal, and
the signal converting unit generates the chrominance signal from the second frequency range component of the image signal.

6. The image processing apparatus according to claim 5, wherein the signal converting unit generates the luminance signal from the sensitivity level signal in which the first frequency range component and the second frequency range component are added.

7. The image processing apparatus according to claim 5, wherein the analog gain coefficient is set to have a correlation so that the analog gain coefficient is lowered as the analog gain becomes high.

8. A camera module comprising:
a pixel interpolation processing unit that generates a sensitivity level value of a lacking color component by interpolation processing of an image signal, wherein
the pixel interpolation processing unit generates the sensitivity level value through addition of a first frequency range component of the image signal for the lacking color component and a second frequency range component of a frequency band lower than the first frequency range component, and adjusts a ratio of the first frequency range component to be added to the second frequency range component, and
the pixel interpolation processing unit adjusts the ratio of the first frequency range component by multiplication of an analog gain coefficient that is correlated with an analog gain of the image signal.

9. The camera module according to claim 8, wherein the analog gain coefficient is set to have a correlation so that the analog gain coefficient is lowered as the analog gain becomes high.

10. The camera module according to claim 8, further comprising a signal converting unit that converts a sensitivity level signal for each color component into a chrominance signal and a luminance signal, wherein
the signal converting unit generates the luminance signal from the first frequency range component of which ratio is adjusted in the pixel interpolation processing unit and the second frequency range component.

11. The camera module according to claim 10, wherein the signal converting unit generates the chrominance signal from the second frequency range component.

12. The camera module according to claim 8, further comprising:
a pixel unit that images an object image;
an analog-digital converter that converts an analog signal from the pixel unit into a digital signal; and
a triangular-wave generating circuit that generates a triangular wave used in conversion from the analog signal into the digital signal in the analog-digital converter, wherein
the triangular-wave generating circuit generates the triangular wave in accordance with an analog gain of the image signal.

* * * * *